(12) United States Patent
Bath

(10) Patent No.: US 8,498,181 B1
(45) Date of Patent: *Jul. 30, 2013

(54) ALARM CLOCK TOUCH SCREEN APPLICATION

(76) Inventor: Eugene R. Bath, Colorado Springs, CO (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/428,176

(22) Filed: Mar. 23, 2012

Related U.S. Application Data

(63) Continuation-in-part of application No. 12/383,105, filed on Mar. 20, 2009, now Pat. No. 8,289,817.

(51) Int. Cl.
*G04B 19/00* (2006.01)
(52) U.S. Cl.
USPC .......................................... 368/244; 368/243
(58) Field of Classification Search
USPC .......................................................... 368/244
See application file for complete search history.

(56) References Cited

U.S. PATENT DOCUMENTS

| 4,279,012 | A | * | 7/1981 | Beckedorff et al. | ............ | 700/16 |
| 4,456,385 | A | * | 6/1984 | Hattori | ............ | 368/187 |
| 7,433,274 | B1 | * | 10/2008 | Bath | ............ | 368/73 |
| 7,457,204 | B1 | * | 11/2008 | Winters | ............ | 368/73 |

* cited by examiner

*Primary Examiner* — R S Luebke
*Assistant Examiner* — Jason Collins
(74) *Attorney, Agent, or Firm* — G. F. Gallinger

(57) ABSTRACT

An alarm clock application for a device having a touch screen, in which time entry consists of progressively entering data into each of three singularly functional groups of keys, comprises: a) a 4 digit time display portion; and, b) a keypad portion consisting of three separated, functional groups of keys: i) a first functional group of keys which provides only a choice between a clock time set function key and an alarm time set function key; ii) a second functional group of keys for time entry, which provides only a ten numeric key group numbered 0-9 for entering numbers; and, iii) a third group of keys which provides only a choice of AM-PM function keys, to finalize any time setting sequence. After time entry consisting of progressively using each of the three singularly functional groups of keys, all entries can, at any time, be reviewed with a glance.

18 Claims, 2 Drawing Sheets

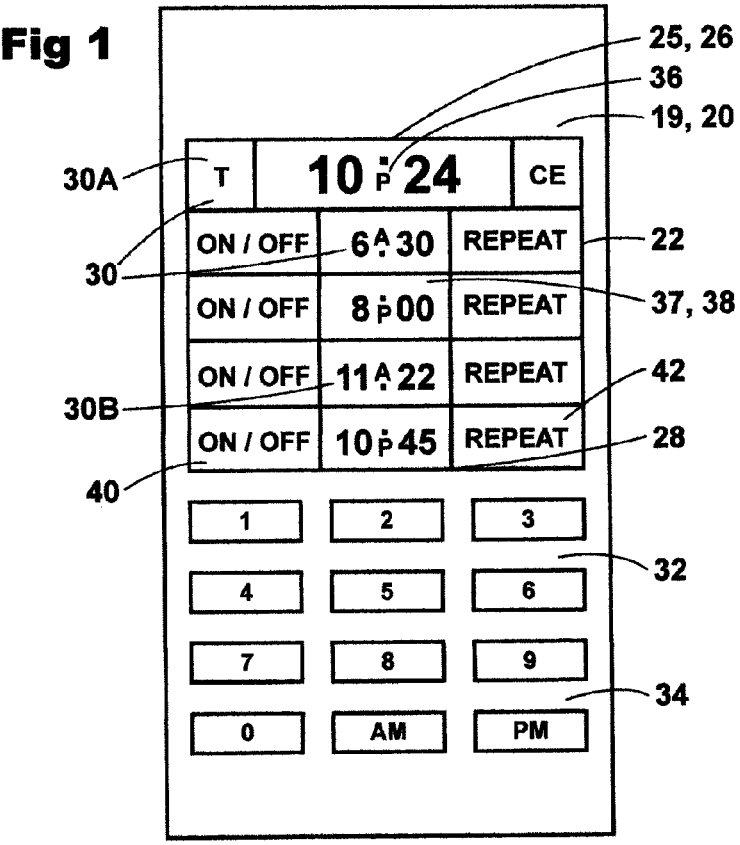
Fig 1
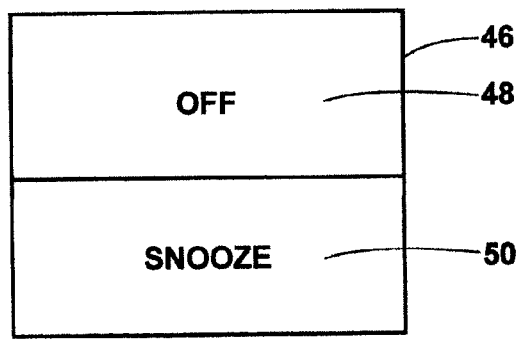
Fig 2
Fig 3
Fig 4

Fig 5

| ON / OFF | 9 : 58 | REPEAT |
| ON / OFF | 8 p 00 | REPEAT |
| ON / OFF | 11 A 22 | REPEAT |
| ON / OFF | 10 p 45 | REPEAT |

| ON / OFF | : 30 | REPEAT | — 22 |
| ON / OFF | 8 p 00 | REPEAT | — 37, 38 |
| ON / OFF | 11 A 22 | REPEAT | — 42 |
| ON / OFF | 10 p 45 | REPEAT | — 28 |

30B

ALARM CLOCK TOUCH SCREEN APPLICATION

PRIOR APPLICATION

This application is filed as a Continuation in Part, and claims the priority, of U.S. patent application Ser. No. 12/383,105 filed Mar. 20, 2009 now U.S. Pat. No. 8,289,817 by Eugene R. Bath.

FIELD OF THE INVENTION

This invention relates to user friendly, and reliable alarm clocks. More particularly this invention relates to an alarm clock application for a device having a touch screen data entry display. The keypad for the alarm application has three functionally separated groups of keys, requiring a user to make a complete entry by successively using each of the three key groups.

BACKGROUND OF THE INVENTION

Digital alarm clocks are unnecessarily complicated in their set up. All too many individuals have missed important appointments when the alarm they thought they had correctly set up, did not awaken or alert them. The volume may have been turned off. The switch may have been in the wrong position. Either the clock or the alarm time may not have been set for the time of day. The clock or the alarm time may have been inadvertently set for PM when AM was intended. Setting the alarm prior to an important appointment is a procedure that must be undertaken, reconsidered, and then rechecked. Concern that one may not awaken on time may ruin a sound night's sleep.

Many individuals do not regularly use an alarm. Many individuals have not adjusted their alarm for many months. Only occasionally when they must arise earlier do they need to adjust and rely on an alarm clock. They may not fully recollect how to ensure that the alarm clock rings for their early schedule. What is needed is an alarm clock with an intuitive keypad setup. An alarm clock which initially prompts and subsequently confirms entered information so that any time during or after information entry, the individual can simply glance at the face of the clock and confirm that what he intends is entered into the clock. It is also useful to have prompts which flash until each necessary selection is made. It is not unusual for an individual on a business trip to have a poor night's sleep prior to an important appointment. His body clock may have been thrown off and he cannot help waking up well in advance of his important appointment to ensure he arrives in a timely fashion. Hotels spend considerable time and energy on wake up calls. The desk clerks don't usually call at precise times. They don't even always call. What is needed is a failsafe alarm clock. A clock which is virtually foolproof in its setup, and a clock which visibly assures a conscientious individual that they will reliably be awakened.

A clock in which all data can be entered wholly through a readily accessible keypad facilitates rapid data entry. Existing alarm clocks do not concurrently display more than one time parameter so that a user is forced to activate keys or switches to view any programmed alarm time. What also is needed is an alarm clock that would continuously and concurrently show, at a glance, the time of day and all activated alarm times.

OBJECTS OF THE INVENTION

It is an object of this invention to disclose an alarm application for a touch screen device which is easy to set up. It is an object of this invention to disclose an alarm application which is difficult to set up improperly. It is an object of this invention to disclose an alarm application in which one intuitively enters information by successively using three functional groups of keys and wherein flashing prompts persist until a final AM/PM selection is made. It is yet a further object of this invention to disclose an alarm clock which prompts a user to enter all data required thereby ensuring that all data is entered correctly. It is an object of this invention to disclose an alarm clock which continuously displays all active parameters and which is configured to only and always activate audibly an alarm when the alarm is displayed, so that a user is continuously assured that he will be awakened when the alarm display is displayed. It is yet a further object of this invention to provide the best possible assurance of alarm activation at the time displayed. In the disclosed clock not only is a low battery indicator comprises both a flashing lamp and a redundant audible alarm. It is a final object of this invention to promote relaxation and assurance, and even better sleep for those who have an important early appointment to attend.

One aspect of this invention provides for an alarm clock application for a device having a touch screen, wherein all settings for time entry consist of using three functionally separated groups of keys for time entry in three progressive steps, comprises: a) a time display portion having a 4 digit time display portion; and, b) a keypad portion consisting of three separated, singularly functional groups of keys for time entry; each group configured and located for the progressive entry of data, which consists of an entry in each of the three groups of keys: i) a first functional group of keys which provides only a choice between a clock time set function key and an alarm time set function key; ii) a second functional group of keys, which provides only a ten numeric key group numbered 0-9 for entering numbers; and, iii) a third group of keys which provides only a choice of AM-PM function keys, to finalize any time setting sequence. The clock can be fully operated by touch alone with a single finger, using a maximum of six touches, thereby providing visual feedback and assurance of not only accurate but complete data entry. After a user has set an alarm time, consisting of an entry in each of the three functional groups of keys, he then can at any time review all his entries with a single glance.

In a preferred aspect of this invention the a portion of the display screen which is used as an alarm time set function key is also used to display the alarm time, so that the portion of the display screen which initially was the alarm time set function key, displays an entered alarm time subsequent to entry of an alarm time.

In the most preferred aspect of this invention a displayed alarm time, has two additional keys associated with it, one of those keys is an on/off toggle key which turns the alarm on and off, and the other is a toggle between a one time activation and an automatic daily repeat activation.

Various other objects, advantages and features of this invention will become apparent to those skilled in the art from the following description in conjunction with the accompanying drawings.

FIGURES OF THE INVENTION

FIG. 1 is a schematic view of a device having a touch screen data entry display screen.

FIG. 2 is a schematic view of a screen which pops up when the alarm sounds.

FIG. 3 is a schematic view of the time display portion of the display screen shown in FIG. 1 wherein the typical colon is partially replaced with one of an "A" above and a "P" below.

FIG. 4 is a schematic view of the time display portion of the display screen shown in FIG. 1 wherein the typical colon is partially replaced with an "H".

FIG. 5 is a figure of a time display portion having an alarm display field and not a time of day field.

FIG. 6 shows the alarm time display field, wherein the remaining time left is shown therein, in place of the alarm time, which was delayed after the after the Snooze key was tapped.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a schematic view of a touch screen data entry display screen 22. An alarm clock or application for a device 20 having a touch screen 22, wherein time entry consists of using each of three singularly functional groups of keys in three progressive steps, comprises: a) a time display portion 26 having a 4 digit time display portion; and, b) a keypad portion 28 consisting of three separated, singularly functional groups of keys; each group configured and located for the progressive entry of data, which consists of an entry in each of the three groups of keys: i) a first functional group of keys 30 which provides only a choice between a clock time set function key 30A and an alarm time set function key 30B; ii) a second functional group of keys 32, which provides only a ten numeric key group numbered 0-9 for entering numbers; and, iii) a third group of keys 34 which provides only a choice of AM-PM function keys, to finalize any time setting sequence. Time entry consists of progressively entering data into each of the three singularly functional groups of keys. The clock can be fully operated by touch alone with a single finger, using a maximum of six touches, thereby providing visual feedback and assurance of not only accurate but complete data entry. After a user has set an alarm time, consisting of an entry in each of the three singularly functional groups of keys, he then can at any time review all his entries with a single glance. In the most preferred embodiment of the invention the time display portion further comprises an AM-PM indicator 36.

It is contemplated that in a cell phone application where the cell phone 19 includes a time of day function, the time display portion 26 may comprise an alarm time display field 38 and would not necessarily include a time of day display field. In yet another embodiment of the invention, preferred for cell phones 19 with small display screens 22, that the keypad portion 28 would successively display one and only one of the three functional groups of keys 30,32,34 at a time, thereby facilitating ease of use with maximally large keys, and wherein completion of an entry in one of the functional groups of keys automatically brings up a next successive functional group of keys, to thereby ensure completion of a time setting sequence.

In a preferred layout the first group of keys 30 are located on a top portion of a keyboard 28, the second group of keys 32 are located on a central portion of the keyboard 28, and the third group of keys 34 are located on a bottom portion of the keyboard 28; so that a complete data entry will comprise an entry from each group of keys 30,32,34 in a top to bottom coverage of the keyboard 28. In yet another embodiment of the invention when the alarm time set function key 30A is selected then the time display portion 26 displays the alarm time as it is entered, and when the clock time set function key 30B is selected then the time display portion 26 displays the clock time as it is entered.

In the most preferred embodiment of the invention a portion of the display screen 22 which is used as an alarm set function key 37 is also used to display a selected alarm time 38, so that the portion of the display screen 22 which initially was the alarm time set function key 30B, displays an entered alarm time subsequent to entry of an alarm time 38. In FIG. 1 two entered and "ON" alarm times 38 are shown in black. Entered alarm times 38 which are "OFF" are dimmed and are shown in grey. It is noted that the clock time can be set by initially tapping the clock time set function key 30A in the first functional group of keys 30, but typically the clock time will be maintained by the internal clock of the device 20 having the touch screen 22.

In a preferred embodiment of the invention a displayed alarm time 38, or an alarm time set function key 30B, has two additional keys associated with it, one of those keys is an on/off toggle key 40 which turns the alarm on and off, and the said other of the additional keys is a repeat toggle 42 between a one time activation and an automatic daily repeat activation. Most preferably when an alarm time is displayed it may be either ON or OFF, and when the alarm is activated by touching the On/Off toggle key 40, it will be visually confirmed on the display field to be On, and will always audibly sound; alternatively, when a displayed alarm time is Off, it will be still showing and visually confirmed to be Off, maintained in memory, and will not sound.

FIG. 2 is a schematic view of a pop up screen 46 which pops up when the alarm sound presenting a user with two options: 1) by tapping an OFF key 48 the alarm sound will be terminated and the alarm time restored to the previous settings; and, 2) by tapping a Snooze key 50, the sound is silenced for a predetermined period of time, but, will once again sound at the end of the snooze period, unless manually terminated by tapping the OFF key 48. Upon tapping the Snooze key 50, the remaining time can be observed in the alarm time display field 38, counting down in minutes and seconds, until zero is reached and the alarm sounds.

FIG. 3 is a schematic view of the time display portion 26 of the display screen 22 shown in FIG. 1 wherein the typical colon is partially replaced with one of an "A" above and a "P" below. Another aspect of the invention provides for wherein within a time display portion, the typical colon is partially replaced with one of an "A" above and a "P" below, continuously indicating the time period as AM or PM respectively. FIG. 4 is a schematic view of the time display portion 26 of the display screen 22 shown in FIG. 1 wherein the typical colon is partially replaced with an "H". When the alarm clock is on a 24 hour display mode, then within a time display, the typical colon is partially replaced with "H". Yet another aspect of the invention provides for the inclusion of an incomplete data entry indicator which is activated when, and only when, entry of data is commenced, but is incomplete. Most preferably the incomplete data entry indicator comprises a flashing display which indicates until, and only until, entry of all data is completed for a selected function.

A quick and reliable method of time entry providing continuous confirmation of both clock operation and alarm activation comprising the steps of: a) obtaining an alarm clock/application as specified above wherein a displayed alarm time has two additional keys 40, 42 associated with it,; b) touching a key 30B in the first group of keys 30 to thereby choose a alarm time-set function; c) consecutively touching three to four keys in the second group of key 32 to thereby enter a time; d) touching a key 34 in the third group of keys to thereby choose either AM or PM for the time entered, thereby finalizing a time entry sequence; and, e) reviewing, entered data for any of the time set functions, continuously displayed on the device 20. Thereafter the user can be assured, by viewing selected times, which are continuously displayed, that the alarm time on the clock is correctly activated.

A quick and reliable method of alarm time entry providing continuous confirmation of both clock operation and alarm activation comprising the steps of: a) obtaining an alarm clock or application as specified above having visual confirmation on the alarm display field 38; b) choosing to activate an alarm time previously entered by locating the alarm time previously entered; c) toggling the On/Off key 40 associated with the alarm time to an On position d) checking and striking the repeat activation key 42 associated with the chosen alarm time if necessary, to deactivate, and ensure that the alarm will activate once and only once; and, e) visually checking that the chosen alarm time is indicated to be activated.

While the invention has been described with preferred specific embodiments thereof, it will be understood that this description is intended to illustrate and not to limit the scope of the invention, which is defined by the following claims.

I claim:

1. An alarm clock application for a device having a touch screen, wherein time entry consists of progressively entering data into each of three singularly functional groups of keys for time entry, comprises:
   a) a time display portion having a four digit time display; and,
   b) a keypad portion consisting of three separated, singularly functional groups of keys for time entry; each group configured and located for the progressive entry of data, which consists of an entry in each of the three groups of keys:
   i) a first functional group of keys which provides only a choice between a clock time set function key and an alarm time set function key;
   ii) a second functional group of keys, which provides a ten numeric key group numbered 0-9 for entering numbers; and,
   iii) a third group of keys which provides only a choice of AM-PM function keys, to finalize any time setting sequence;
   wherein time entry consists of progressively entering data into each of the three singularly functional groups of keys;
   so that the clock can be fully operated by touch alone with a single finger, using a maximum of six touches, thereby providing visual feedback and assurance of not only accurate but complete data entry; and,
   so that after a user has set an alarm time, consisting of an entry in each of the three functional groups of keys, he then can at any time review all his entries.

2. An alarm clock application as in claim 1 wherein the time display portion further comprises an AM-PM indicator.

3. An alarm clock application as in claim 1, preferred for a cell phone with a small display screen, wherein the keypad portion of the touch screen successively displays one and only one of the three singularly functional groups of keys at a time, thereby facilitating ease of use with maximally large keys, and wherein completion of an entry in one of the functional groups of keys automatically brings up a next successive functional group of keys, to thereby ensure completion of a time entry.

4. An alarm clock application as in claim 1, for a device having a pre-existing and independent time of day time function, wherein the time display portion comprises an alarm time display field and does not include a time of day display field.

5. An alarm clock application as in claim 1 wherein the first group of keys are located on a top portion of a keyboard, the second group of keys are located on a central portion of the keyboard, and the third group of keys are located on a bottom portion of the keyboard; so that a complete data entry will comprise an entry in each group of keys in a top to bottom progression on the keyboard.

6. An alarm clock application as in claim 5 wherein when the alarm time set function key is selected then the time display portion displays the alarm time as it is entered, and when the clock time set function key is selected then the time display portion displays the clock time as it is entered.

7. An alarm clock application clock/application as in claim 6 wherein a portion of the display screen which is used as an alarm set function key is also used to display the alarm time, so that the portion of the display screen which initially was the alarm time set function key, displays an entered alarm time subsequent to entry of an alarm time.

8. An alarm clock application as in claim 7 wherein a displayed alarm time, has two additional keys associated with it, one of those keys is an On/Off toggle key which turns the alarm on and off, and the other of the additional keys is a repeat toggle between a one time activation and an automatic daily repeat activation, said other of the additional keys becoming highlighted when the automatic daily repeat activation is selected.

9. An alarm clock application as in claim 8 wherein when an alarm time is displayed it may be either ON or OFF, and when the alarm is activated by touching the On/Off toggle key, it will be visually confirmed on the display field to be On, and will always audibly sound; alternatively, when a displayed alarm time is Off, it will be still showing and visually confirmed to be Off, maintained in memory, and will not sound.

10. A method of alarm time entry providing continuous confirmation of both clock operation and alarm activation comprising the steps of:
   a) obtaining an alarm clock/application as specified in claim 9;
   b) choosing to reactivate an alarm time previously entered by locating the alarm time previously entered;
   c) toggling the On/Off key associated with the alarm time to an On position;
   d) checking and striking the repeat toggle key associated with the chosen alarm time, if necessary, to ensure that the alarm will activate once only once; and,
   e) visually checking that the chosen alarm time is indicated to be activated.

11. A method of time entry providing continuous confirmation of both clock operation and alarm activation comprising the steps of:
   a) obtaining an alarm clock/application as specified in claim 7;
   b) touching a key in the first group of keys to thereby choose a alarm time-set function;
   d) consecutively touching three to four keys in the second group of key to thereby enter a time;
   e) touching a key in the third group of keys to thereby choose either AM or PM for the time entered, thereby finalizing a time entry sequence;
   f) reviewing, entered data for any of the time set functions, continuously displayed on the alarm clock; and, so that thereafter the user can know, by viewing selected times, which are continuously displayed, that an alarm on the device is correctly activated.

12. An alarm clock application as in claim 1 wherein the clock time, maintained by the internal clock of the device having the touch screen, can be set by initially tapping the clock time set function key in the first functional group of keys.

13. An alarm clock application as in claim 1 further comprising an additional display which pops up when the alarm sounds presenting a user with two options: 1) by tapping an OFF key the alarm sound will be terminated and the alarm time restored to the previous settings; and, 2) by tapping a Snooze key, the sound is silenced for a predetermined period of time, but, will once again sound at the end of the snooze period, unless manually terminated by tapping the OFF key.

14. An alarm clock application as in claim 13 wherein upon alarm actuation, and upon tapping the Snooze key, the remaining time can be observed in the alarm time display field, counting down in minutes and seconds, until zero is reached and the alarm sounds.

15. An alarm clock application as in claim 1 wherein in a time display portion, the typical colon is partially replaced with one of an 'A' above and a 'P' below, continuously indicating the time period as AM or PM respectively.

16. An alarm clock application as in claim 1 wherein in a time display portion, if the clock is operating in a 24 hour clock mode, the typical colon is partially replaced with an 'H' continuously displayed in the lower colon position, in the displayed time.

17. An alarm clock application as in claim 1 further comprising an incomplete data entry indicator which is activated when, and only when, entry of data is commenced, but is incomplete.

18. An alarm clock application as in claim 17 wherein the incomplete data entry indicator comprises a flashing display which indicates until, and only until, entry of all data is completed for a selected function.

\* \* \* \* \*